United States Patent
Andrews

(10) Patent No.: US 12,543,618 B2
(45) Date of Patent: Feb. 10, 2026

(54) RETRACTABLE SPIKE TOOTH HARROW FOR LARGE FIELD CULTIVATOR

(71) Applicant: CNH Industrial America LLC, New Holland, PA (US)

(72) Inventor: Jason Eric Andrews, Eureka, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 491 days.

(21) Appl. No.: 18/083,910

(22) Filed: Dec. 19, 2022

(65) Prior Publication Data
US 2024/0196777 A1 Jun. 20, 2024

(51) Int. Cl.
*A01B 63/32* (2006.01)
*A01B 19/04* (2006.01)
*A01B 73/04* (2006.01)

(52) U.S. Cl.
CPC .............. *A01B 63/32* (2013.01); *A01B 19/04* (2013.01); *A01B 73/044* (2013.01)

(58) Field of Classification Search
CPC ..... A01B 63/32; A01B 23/043; A01B 73/044; A01B 19/04; A01B 19/08; A01B 23/02; A01B 73/02
See application file for complete search history.

(56) References Cited

U.S. PATENT DOCUMENTS

| | | | | |
|---|---|---|---|---|
| 1,117,328 A * | 11/1914 | Clauson | ................. | A01B 63/32 172/470 |
| 2,963,098 A * | 12/1960 | Kesselring | ............. | A01B 19/00 172/488 |
| 3,173,497 A * | 3/1965 | French | ................... | A01B 73/02 172/456 |
| 3,362,483 A | 1/1968 | Twidale | | |
| 3,490,542 A * | 1/1970 | Eiten | ...................... | A01B 63/32 172/470 |
| 3,502,154 A * | 3/1970 | Rogers | ................... | A01B 73/02 172/419 |
| 3,613,801 A * | 10/1971 | Roth | ...................... | A01B 63/32 172/482 |
| 4,396,069 A * | 8/1983 | Ferber | .................... | A01B 63/32 D15/27 |
| 5,806,606 A * | 9/1998 | Robinson | ............... | A01B 63/32 172/198 |
| 10,194,573 B2 * | 2/2019 | Steinlage | ............... | A01B 49/02 |
| 10,542,658 B2 | 1/2020 | Knobloch | | |

(Continued)

OTHER PUBLICATIONS

General Implement Distributions, Flexible & Rigid Spike Tooth Harrows, Sep. 2018, https://docplayer.net/99283348-Flexible-rigid-spike-tooth-harrows-harrow.html, 7 pgs.

*Primary Examiner* — Christopher J Sebesta
*Assistant Examiner* — Blake E Scoville
(74) *Attorney, Agent, or Firm* — Fletcher Yoder, P.C.

(57) ABSTRACT

A spike tooth harrow of a tillage implement includes a plurality of arms configured to couple to a frame section of the tillage implement. The spike tooth harrow also includes a plurality of bars coupled to the plurality of arms, wherein each bar of the plurality of bars includes a plurality of spikes angled relative to a direction of travel of the tillage implement, the plurality of bars are coupled to the plurality of arms via cables, and the spike tooth harrow is configured to extend and to retract the plurality of bars relative to the plurality of arms.

13 Claims, 4 Drawing Sheets

(56) References Cited

U.S. PATENT DOCUMENTS

2016/0073572 A1* 3/2016 Evans .................. A01B 49/027
                                                    172/1
2017/0079190 A1   3/2017 Steinlage et al.
2018/0103575 A1* 4/2018 Gerber .................. A01B 19/04

* cited by examiner

RETRACTABLE SPIKE TOOTH HARROW FOR LARGE FIELD CULTIVATOR

BACKGROUND

The present disclosure relates generally to a retractable spike tooth harrow for a large field cultivator.

Farmers utilize a wide variety of agricultural tillage implements to prepare soil for planting. Some of these implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow to level soil after it has been tilled by, e.g., a cultivator. Level soil promotes uniform planting depth and uniform germination. More specifically, the spike tooth harrows typically include a plurality of ground engaging elements, such as spikes, which extend downward from a frame of the harrow. These ground engaging elements may be configured to contact and engage the soil.

Typically, these spike tooth harrows include bars having the spikes hang from chains coupled to arms (e.g., basket arms) that are mounted to a rear of the field cultivator. When the sections of the implement fold, these chains have a tendency to catch on bolts and get tangled. Also, during this folding, the bars may shift as they go over center and catch on other wing fold sections. Typically, catch brackets are installed with marginal success in retaining the spike tooth harrow by enabling the bars to hit the catch brackets during folding. However, if the spike tooth harrow misses the catch bracket when folding, it can crash down on other components and damage them (as well as damage the mounting of the arms of the harrow). In addition, when tangling of the spike tooth harrow occurs, an operator of the implement has to stop the tractor, leave the cab, and manually untangle the machine.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a tillage implement is provided. The tillage implement includes a center frame section. The tillage implement also includes a wing frame section coupled to the center frame section. The tillage implement further includes a spike tooth harrow coupled to the wing frame section. The spike tooth harrow includes a plurality of arms coupled to the wing frame section. The spike tooth harrow also includes a plurality of bars coupled to the plurality of arms, wherein each bar of the plurality of bars includes a plurality of spikes angled relative to a direction of travel of the tillage implement, the plurality of bars are coupled to the plurality of arms via cables, and the spike tooth harrow is configured to extend and to retract the plurality of bars relative to the plurality of arms In certain embodiments, a spike tooth harrow of a tillage implement is provided. The spike tooth harrow includes a plurality of arms configured to couple to a frame section of the tillage implement. The spike tooth harrow also includes a plurality of bars coupled to the plurality of arms, wherein each bar of the plurality of bars includes a plurality of spikes angled relative to a direction of travel of the tillage implement, the plurality of bars are coupled to the plurality of arms via cables, and the spike tooth harrow is configured to extend and to retract the plurality of bars relative to the plurality of arms.

In certain embodiments, a method for controlling extension and retraction of a spike tooth harrow of a tillage implement is provided. The method includes adjusting a stroke length of a respective hydraulic cylinder disposed within each arm of a plurality of arms of the spike tooth harrow, wherein the plurality of arms are coupled to a plurality of bars, each bar of the plurality of bars includes a plurality of spikes angled relative to a direction of travel of the tillage implement, and the plurality of bars are coupled to an end of each respective hydraulic cylinder via cables. The method also includes, in response to adjusting the stroke length, adjusting a distance between the plurality of arms and the plurality of bars.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
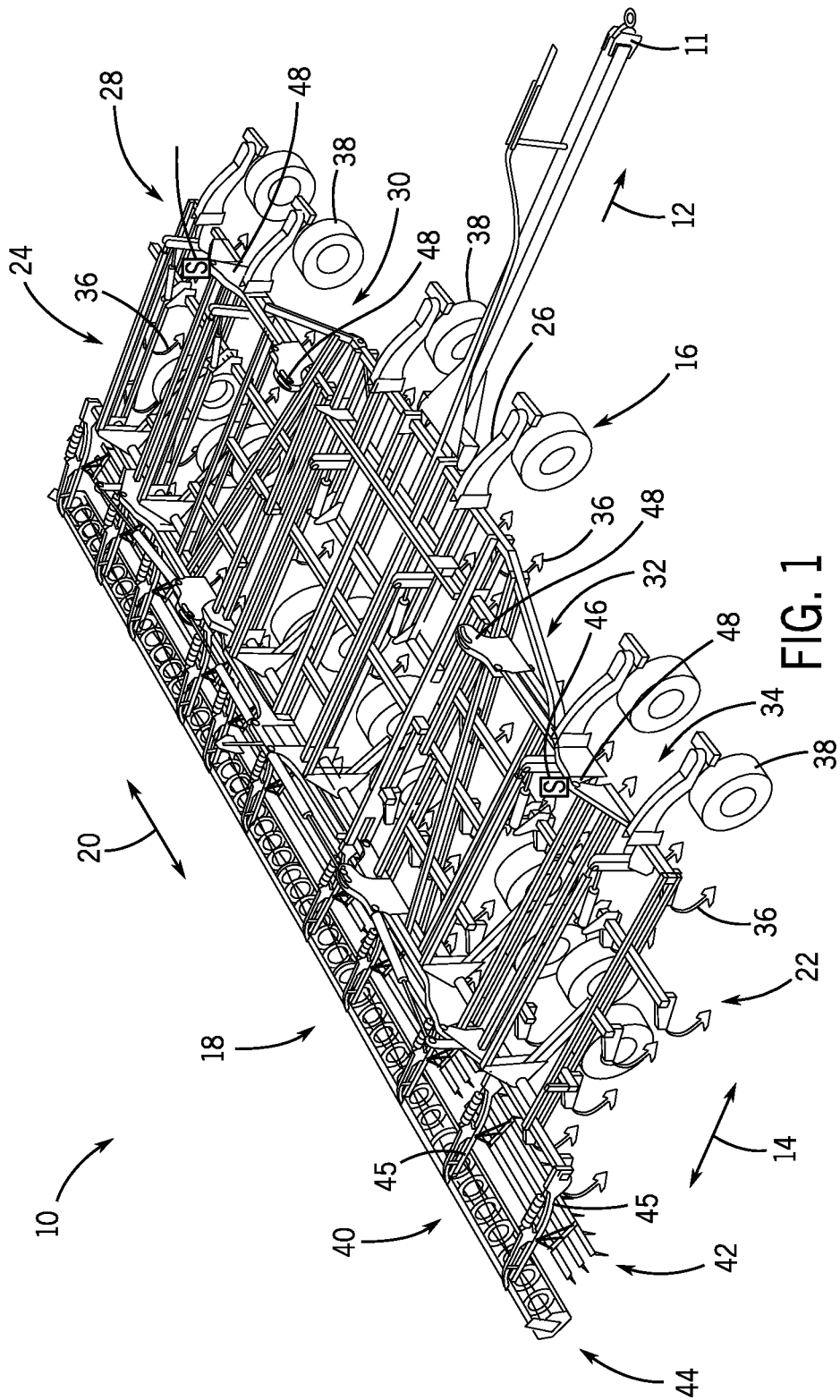
FIG. 1 is a perspective view of an agricultural tillage implement in the form of a field cultivator (e.g., in an operating configuration), in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is generally directed to a retractable spike tooth harrow of an agricultural implement (e.g., tillage implement such as a large field cultivator). The spike tooth harrow includes a plurality of arms configured to couple to a frame section of the agricultural implement. In certain embodiments, the arms are coupled to a wing frame section of the agricultural implement. The spike tooth harrow also includes a plurality of bars coupled to the plurality of arms, wherein each bar of the plurality of bars includes a plurality of spikes angled relative to a direction of travel of the agricultural implement, the plurality of bars are coupled to the plurality of arms via cables, and the spike tooth harrow is configured to extend and to retract the plurality of bars relative to the plurality of arms. In particular, a hydraulic cylinder is disposed within each arm of the pair of arms. The cables coupled to the plurality of bars are coupled to pins at the respective ends of the hydraulic cylinders. The cables coupling the plurality of bars to the pins are of different lengths. Each pin extends out through a slot in a side wall of the respective arm. Adjusting a respective stroke length of the hydraulic actuators adjusts both a position of the pin in the slot and a distance between the respective arm and the plurality of bars. The spike tooth harrow retracts and extends the plurality of bars relative to the plurality of arms between a fully extended position and a retracted position (while enabling an adjustment of a working position and desired depth of the spike tooth harrow). The plurality of bars and their associated their respective plurality of spikes are configured to not get tangled with any component of the agricultural implement during both retraction to a retracted position and folding of the wing frame section relative to a center frame section of the agricultural implement. This keeps the spike tooth harrow and the rest of the agricultural implement from being damaged. In addition, any delays due to tangling of the spike tooth harrow are avoided. Further, guide brackets on the bars, which are normally utilized to avoid tangling of the spike tooth harrow but can interfere with soil flow, are no longer needed.

Referring now to the drawings, FIG. 1 illustrates a perspective view of an agricultural tillage implement 10 (e.g., double fold machine) in the form of a field cultivator (e.g., in an operating configuration). The implement 10 may be configured to be coupled to a work vehicle (e.g., tractor) via a hitch assembly 11 and towed along a forward direction of travel 12 by the work vehicle.

The implement 10 extends in in a longitudinal direction (e.g., as indicated by arrow 14 in FIG. 1) between a forward end 16 and an aft or rear end 18. The implement 10 also extends in a lateral direction (e.g., as indicated by arrow 20) between a first side 22 and a second side 24.

The implement 10 is configured as a multi-section field cultivator. The implement 10 includes a main frame section 26 and a plurality of wing sections 28, 30, 32, and 34 (wing frame sections). The left wing sections (e.g., relative to the direction of travel 12) are designated 28 and 30. The right wing sections (e.g., relative to the direction of travel 12) are designated 32 and 34. Wing sections 28 and 34 are outer wing sections. Wing sections 30 and 32 are inner wing or intermediate wing sections coupled to the main frame section 26. The number of wing sections may vary for the implement 10.

Each section 26, 28, 30, 32, and 34 includes a plurality of structural frame members such as beam, bars, and/or the like, configured to support a plurality of components. Each section 26, 28, 30, 32, and 34 includes a plurality of cultivator members 36 (e.g., as depicted shank assemblies) that are pulled though the soil as the implement 10 moves in the direction of travel 12. Additionally, one or more wheel assemblies 38 are coupled to the sections 26, 28, 30, 32, and 34 to support the weight of the implement 10, thereby enabling the implement 10 to be towed across the field.

Each section 26, 28, 30, 32, and 34 includes a rear auxiliary implement 40 for finishing the soil. The rear auxiliary implement 40 includes a spike tooth harrow 42 and a rolling basket 44 (e.g., crumbler) that act together to finish the soil. The spike tooth harrow 42 is longitudinally 14 disposed between a respective frame section 26, 28, 30, 32, and 34 and a respective rolling basket 44. Each spike tooth harrow 42 is coupled to its respective section 26, 28, 30, 32, and 34 via one or more arms 45 (e.g., basket arms), which are also coupled to the respective rolling baskets 44. As depicted, each spike tooth harrow 42 is coupled to its respective section 26, 28, 30, 32, and 34 via two arms 45. As described in greater detail below, one or more of the spike tooth harrows 42 is configured to be retractable. In particular, one or more of the spike tooth harrows 42 is configured to be extended and to be retracted between a fully extended position and a retracted position. In certain embodiments, only the outer wing sections 28 and 34 include a retractable spike tooth harrow 42. In certain embodiments, all of the wing sections 28, 30, 32, and 34 include a retractable spike tooth harrow 42. In certain embodiments, each section 26, 28, 30, 32, and 34 includes a retractable spike tooth harrow 42.

Figure 2:
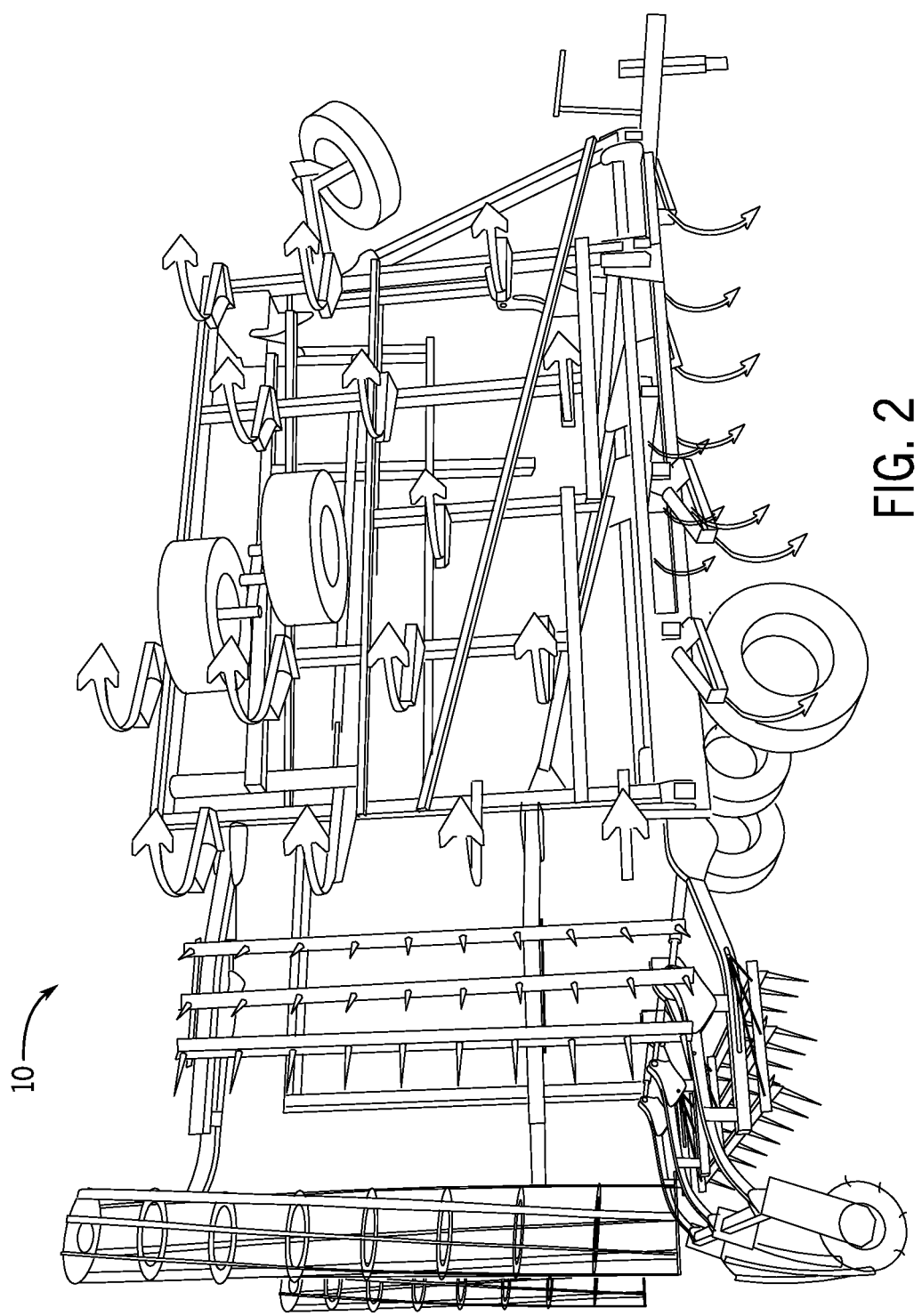
FIG. 2 is a perspective view of an agricultural tillage implement in a transport configuration, in accordance with aspects of the present disclosure.

As depicted, the implement 10 is in an operating (e.g., unfolded) configuration. In certain embodiments, the implement 10 is in a transport (e.g., folded) configuration (see FIG. 2 which shows a folded configuration for a single fold machine) where some of the sections 28, 30, 32, and 34 may be folded up relative to the main frame section 26. For example, the sections 28 and 34 are folded (e.g., pivoted) over the sections 30 and 32 (e.g., 180 degrees in the lateral direction 20 toward the main frame section 26), respectively. Then, the folded sections 28 and 30 and the folded sections 32 and 34 are pivoted are each folded upward into a vertical position (e.g., 90 degrees in the lateral direction 20 toward the main frame section 26).

Prior to the folding of the sections 28, 30, 32, and 34, one or more of the spike tooth harrows 42 are configured to be retracted into a retracted position. Upon nearing the completion of unfolding of the sections 28, 30, 32, and 34 into the operating configuration, one or more of the spike tooth harrows 42 are configured to be extended to a desired depth. The components (e.g., bars, cables, and spikes) of the retractable spike tooth harrows 42 are configured to not get tangled with any component of the implement 10 during both retraction to the retracted position and the folding of the respective wing frame sections 28, 30, 32, and 34.

In certain embodiments, one or more magnetic sensors or switches 46 may disposed on respective hinges 48 between the outer wings sections 28 and 34 and the intermediate wing sections 30 and 32. In certain embodiments, the magnetic sensor 46 is disposed on a single hinge 48 (e.g., between outer wing section 28 and intermediate wing section 30 or between outer wing section 34 and intermediate wing section 32). In certain embodiments, a respective magnetic sensor 46 is disposed both on the hinge 48 between the outer wing section 28 and the intermediate wing section 30 and the hinge 48 between the outer wing section 34 and the intermediate wing section 32. In certain embodiments, respective magnetic sensors 46 may be disposed on the respective hinges 48 between the intermediate wing sections 30 and 32 and the main frame section 26. The one or more magnetic sensors 46 may be coupled to the hydraulic system for the folding and unfolding of the sections 28, 30, 32, and 34 relative to the main frame section 26 as well as the extension and retraction of one or more of the spike tooth harrows 42. The one or more magnetic sensors 46 may be configured to detect when the wing sections 28, 30, 32, and 34 are folded relative to the main frame section 26 and when the wing frame sections 28, 30, 32, and 34 are unfolded relative to the main frame section 26. Signals from the one or more magnetic sensors 46 (e.g., provided by built in relays) are configured to actuate one or more valves (e.g. solenoid valves) that regulate the flow of hydraulic fluid to hydraulic cylinders that extend and retract the spike tooth harrows 42. For example, upon the folding of the sections 28, 30, 32, and 34, flow of hydraulic fluid to the hydraulic cylinders may be stopped (e.g., via closing the solenoid valves) to hold the spike tooth harrows 42 in the retracted position. Upon the nearly complete unfolding of the sections 28, 30, 32, and 34, flow of hydraulic fluid to the hydraulic cylinder may be resumed (e.g., via opening of the solenoid valves) to enable the spike tooth harrows 42 to be extended to a working position and desired depth.

In certain embodiments, the implement 10 may lack magnetic sensors 46. The hydraulic system may receive signals from an operator in the work vehicle that actuates valves to regulate the hydraulic fluid provided to the hydraulic cylinders of the spike tooth harrows 42.

Figure 3:
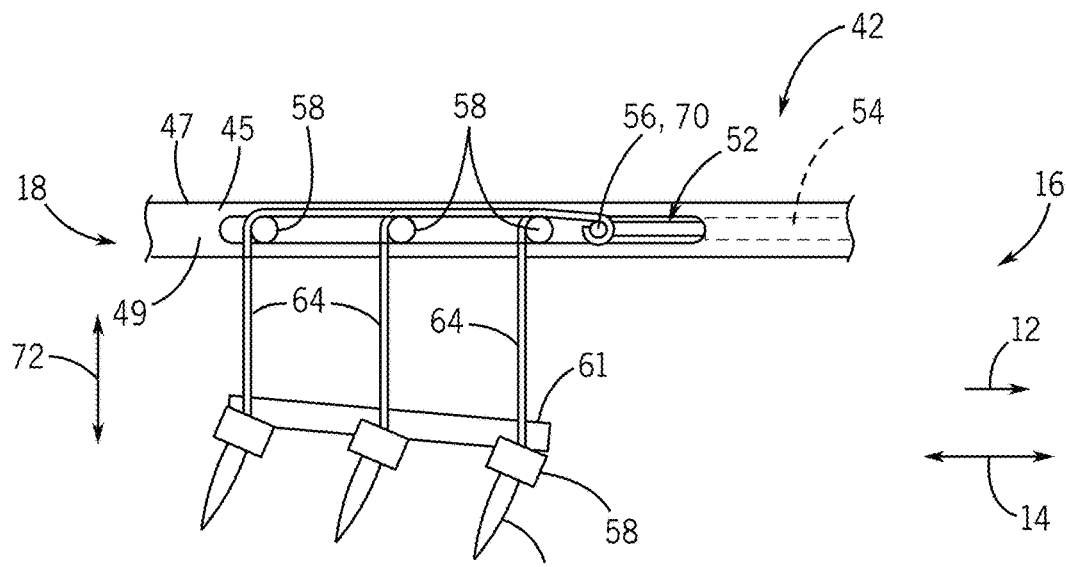
FIG. 3 is a side view of a portion of a retractable spike tooth harrow (e.g., in a fully extended position), in accordance with aspects of the present disclosure.
Figure 4:
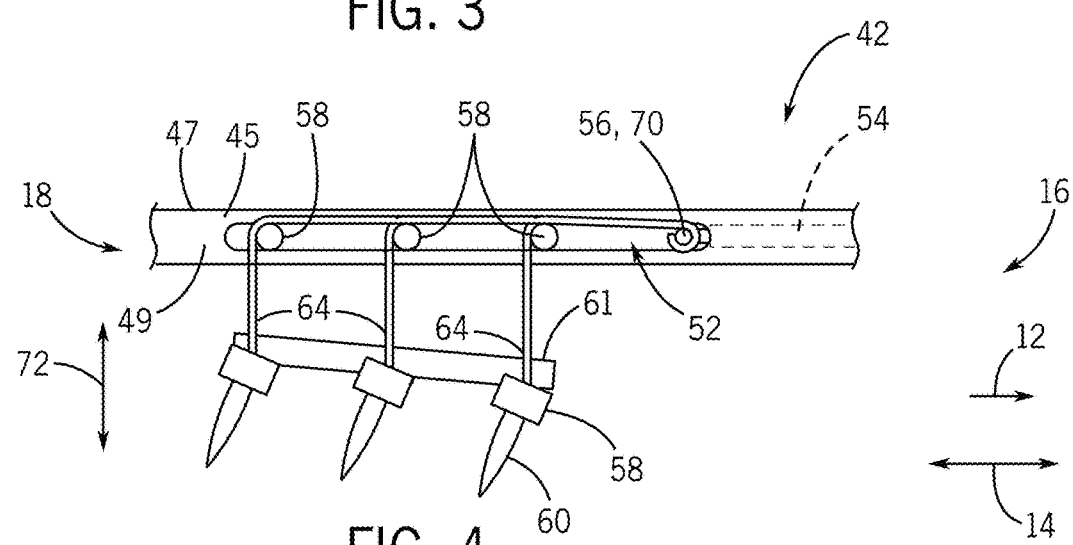
FIG. 4 is a side view of the portion of the retractable spike tooth harrow in FIG. 3 (e.g., in a retracted position), in accordance with aspects of the present disclosure.
Figure 5:
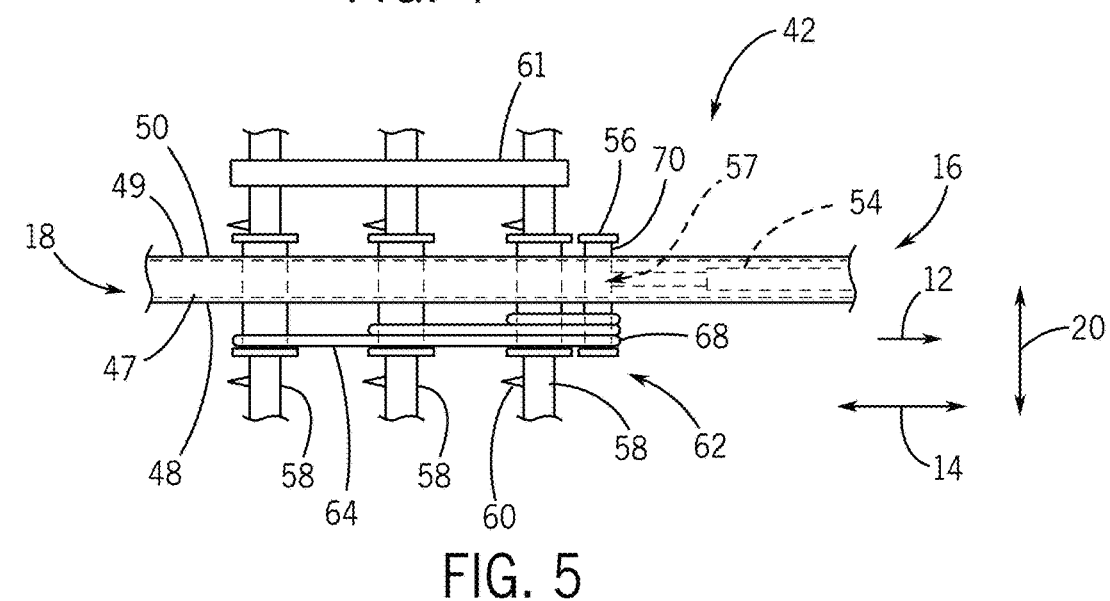
FIG. 5 is a top view of the portion of the retractable spike tooth harrow in FIGS. 3 and 4, in accordance with aspects of the present disclosure.

FIGS. 3 and 4 are side view of a portion the retractable spike tooth harrow 42. FIG. 5 is a top view of the portion of the spike tooth harrow 42. The retractable spike tooth harrow 42 is in a fully extended position in FIG. 3. The retractable spike tooth harrow 42 is in a retracted position in FIG. 4. The retractable spike tooth harrow 42 includes a plurality of arms 45. Only one arm 45 is depicted in FIGS. 4 and 5. A couple of arms 45 are depicted in FIG. 1. The number of arms 45 may vary. Each arm 45 includes a top wall 47 and side wall 49 and side wall 50 (see FIG. 5) flanking the top wall 47. Corresponding slots 52 extend along a portion of the side wall 49 and 50 in the longitudinal direction 14. A respective hydraulic cylinder 54 is disposed within each arm 45. A pin 56 is coupled to an end 57 of the hydraulic cylinder 54 (see FIG. 5). In particular, the pin 56 extends through an opening or hole in the end 57 of the hydraulic cylinder 54 and extends through the corresponding slots 52.

The retractable spike tooth harrow 42 also includes a plurality of bars 58 coupled to the plurality of arms 45. As depicted, the spike tooth harrow 42 includes three bars 58. Each bar 58 includes a plurality of spikes 60. The number of spikes 60 on each bar 58 may vary. As depicted, the spikes 60 are angled toward the rear end 18 of the implement (e.g., implement 10 in FIG. 1) relative to the direction of travel 12. In certain embodiments, a bracket 61 extending in the longitudinal direction 14 is coupled to each of the bars 58. Each bar 58 is coupled to an end 62 (see FIG. 5) of the pin 56 via a respective cable 64. One end (e.g., looped end) of the cable 64 is coupled to the bar 58 and the other end 68 (e.g., looped end) of the cable 64 is coupled to the pin 56 (e.g., disposed about the pin 56) on the same side of the arm 45 (e.g., adjacent the side wall 49). One or more washers 70 may be disposed on the pin 56 as well. Each cable 64 coupling the respective bars 58 to a particular arm 45 has a different length. Each cable 64 is disposed over a respective bushing or roller 72 outside the arm 45. In certain embodiments, each cable 64 is disposed over the respective busing or roller 74 within the arm 45 and the cables 64 may extend from a bottom of the arm 46 (e.g., through a slot in a bottom wall of the arm 46). The cables 64 roll over the respective bushings or rollers 74 as the cables 64 are extended or retracted via the hydraulic cylinder 54.

The hydraulic cylinder 54 is coupled to a hydraulic system of the implement that controls the for the folding and unfolding of the wing sections (e.g., sections 28, 30, 32, and 34 in FIG. 1) relative to the main frame section (e.g., main frame section 26 in FIG. 1). The hydraulic system is utilized as well for the extension and retraction of the bars 58 relative to the arms 45 in a vertical direction 72 relative to the soil. Adjustment of a cylinder stroke length of the hydraulic cylinders 54 adjust the distance between the bars 58 and the arms 45 (and a position of the pin 56 in the corresponding slots 52). For example, increasing the cylinder stroke length of the hydraulic cylinders 54 results in the bars 58 being extended away from the arms 45 to a working position and desired depth as depicted in FIG. 3. Decreasing the cylinder stroke length of the hydraulic cylinders 54 results in the bars 58 being retracted closer to the arms 45 so that during folding of the sections of the implement and retraction of the spike tooth harrow 42 the components of the spike tooth harrow 42 do not get tangled with any component of the implement. In the fully retracted position in FIG. 4, the cables 64 include a small of flexibility or give.

Figure 6:
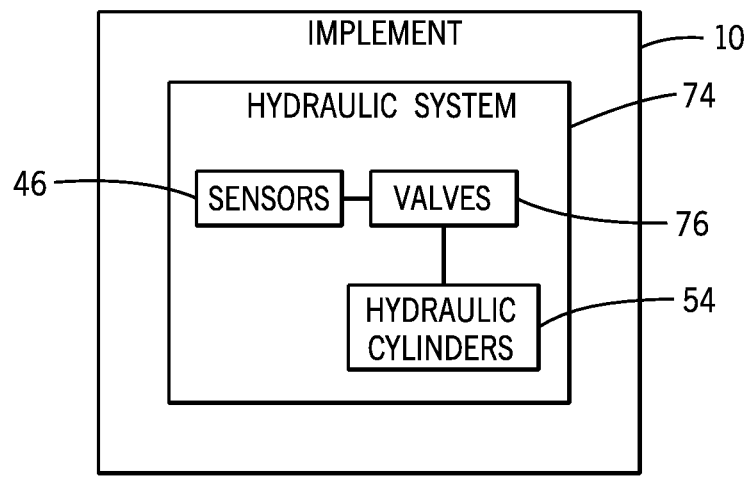
FIG. 6 is a schematic view of a hydraulic system for the agricultural tillage implement in FIG. 1, in accordance with aspects of the present disclosure.

FIG. 6 is a schematic view of a hydraulic system 74 for the agricultural tillage implement 10 in FIG. 1. Although not depicted, the hydraulic system 74 is fluidly coupled to a hydraulic system on a work vehicle that tows the implement 10. The hydraulic system 74 is utilized for the folding and unfolding of the wing sections (e.g., wing sections 28, 30, 32, and 34 in FIG. 1) relative to the main frame section (e.g., main frame section 26 in FIG. 1) as well as the extension and retraction of one or more of the spike tooth harrows (e.g., spike tooth harrows 42 in FIG. 1). As depicted, the hydraulic system 74 includes valves 76 (e.g. solenoid valves) that regulate the flow of hydraulic fluid to the hydraulic cylinders 54 of the spike tooth harrows. The hydraulic system 74 includes one or more magnetic sensors 46 configured to detect when the wing sections are folded relative to the main frame section and when the wing frame sections are unfolded relative to the main frame section. Signals from the one or more magnetic sensors 46 (e.g., provided by built in relays) are configured to actuate the 76 valves to regulate the flow of hydraulic fluid to hydraulic cylinders 54 that extend and retract the spike tooth harrows 42. For example, upon the folding of the wing sections, flow of hydraulic fluid to the hydraulic cylinders 54 may be stopped (e.g., via closing the valves 76) to hold the spike tooth harrows in the retracted position. Upon the nearly complete unfolding of the sections 28, 30, 32, and 34, flow of hydraulic fluid to the hydraulic cylinders 54 may be resumed (e.g., via opening of the valves 76) to enable the spike tooth harrows to be extended to a working position and desired depth. Just prior to the folding of the wing sections relative to the main frame section, the hydraulic cylinders 54 will first initiate the retraction of the spike tooth harrows due to less resistance (e.g., due to hydraulic cylinders 54 being smaller than hydraulic cylinder being utilized for the folding and unfolding of the wing sections).

Figure 7:
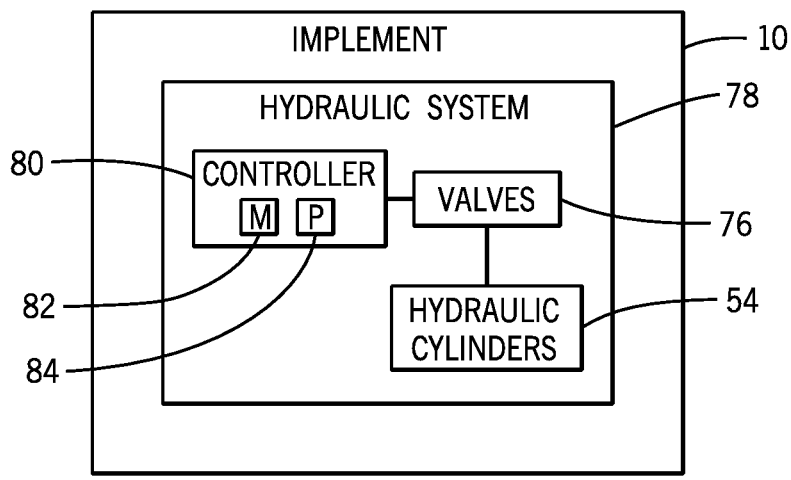
FIG. 7 is a schematic view of a hydraulic system for the agricultural tillage implement in FIG. 1 (e.g., responsive to operator control signals), in accordance with aspects of the present disclosure.

FIG. 7 is a schematic view of the hydraulic system 78 for the agricultural tillage implement 10 in FIG. 1. The hydraulic system 78 is similar to the hydraulic system 74 in FIG. 6 except the hydraulic system 78 lacks the magnetic sensors 46. In certain embodiments, the hydraulic system 78 may be separate from the hydraulic system utilized to fold and unfold the wing sections of the implement 10. The valves 76 are coupled to a controller 80. In response to control signals received from an operator in the work vehicle (e.g., via a controller in the work vehicle) coupled to the implement, the controller 80 may provide control signals to actuators to open and close the valves 76 to regulate the extension and retraction of the spike tooth harrows.

The controller 80 may include a memory 82 and a processor 84. In some embodiments, the processor 84 may include one or more general purpose processors, one or more application specific integrated circuits, one or more field programmable gate arrays, or the like. Additionally, the memory 82 may be any tangible, non-transitory, computer readable medium that is capable of storing instructions executable by the processor 84 and/or data that may be processed by the processor 84. In other words, the memory 82 may include volatile memory, such as random access memory, or non-volatile memory, such as hard disk drives, read only memory, optical disks, flash memory, and the like.

Figure 8:
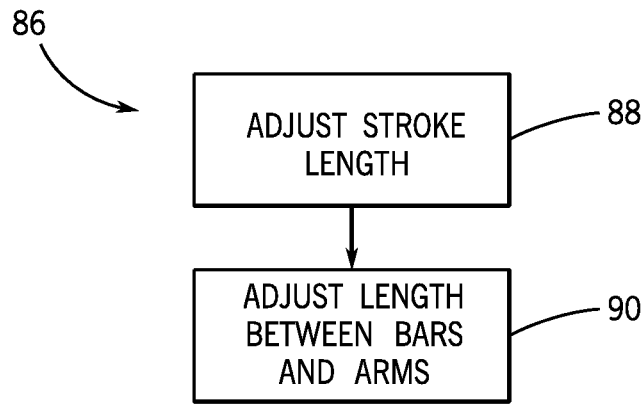
FIG. 8 is a flow chart of a method for controlling extension and retraction of a spike tooth harrow of a tillage implement, in accordance with aspects of the present disclosure.

FIG. 8 is a flow chart of a method 86 for controlling extension and retraction of a spike tooth harrow (e.g., spike tooth harrow 42 in FIG. 1 of a tillage implement (e.g., implement 10 in FIG. 1). The method 86 includes adjusting a stroke length of a respective hydraulic cylinder disposed within each arm of a plurality of arms of the spike tooth harrow (block 88). As described above in FIGS. 3-5, the plurality of arms are coupled to a plurality of bars, and each bar of the plurality of bars includes a plurality of spikes angled relative to a direction of travel of the tillage implement. Also, the plurality of bars are coupled to an end of each respective hydraulic cylinder via cables. The method 86 also includes, in response to adjusting the stroke length, adjusting a distance between the plurality of arms and the plurality of bars. For example, the plurality of bars may be retracted relative to the plurality of arms or the plurality of bars may be extended relative to the plurality of arms to a desired working depth.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tillage implement, comprising:
a center frame section;
a wing frame section coupled to the center frame section; and
a spike tooth harrow coupled to the wing frame section, comprising:
a plurality of arms coupled to the wing frame section; and
a plurality of bars coupled to the plurality of arms, wherein each bar of the plurality of bars comprises a plurality of spikes angled relative to a direction of travel of the tillage implement, the plurality of bars are coupled to the plurality of arms via cables, and the spike tooth harrow is configured to extend and to retract the plurality of bars relative to the plurality of arms;
wherein each arm of the plurality of arms comprises a hydraulic cylinder disposed within, and the cables are coupled to an end of the hydraulic cylinder;
wherein each arm of the plurality of arms comprises a top wall, and a first side wall and a second side wall flanking the top wall, and the first side wall comprises a slot extending along a portion of the first side wall relative to a longitudinal axis of a respective arm of the plurality of arms that the hydraulic cylinder is disposed within; and
wherein each arm of the plurality of arms comprises a pin coupled to the end of the hydraulic cylinder, the pin extends out of the slot, and the cables are coupled to the pin.

2. The tillage implement of claim 1, wherein the hydraulic cylinder is configured to adjust its cylinder stroke length to adjust both a position of the pin in the slot and a distance between the respective arm and the plurality of bars.

3. The tillage implement of claim 2, wherein each bar of the plurality of bars is coupled to the pin with a different length cable.

4. The tillage implement of claim 1, wherein the spike tooth harrow is configured to extend and to retract the plurality of bars relative to the plurality of arms between a fully extended position and a retracted position.

5. The tillage implement of claim 4, wherein the wing frame section is configured to fold relative to the center frame section when the tillage implement is changed from an operating configuration to a transport configuration, and the spike tooth harrow is configured to retract the plurality of bars relative to the plurality arms to the retracted position prior to the folding of the wing frame section relative to the center frame section.

6. The tillage implement of claim 5, wherein the plurality of bars and their respective plurality of spikes are configured to not get tangled with any component of the tillage implement during both retraction to the retracted position and the folding of the wing frame section relative to the center frame section.

7. The tillage implement of claim 5, wherein the tillage implement comprises a hydraulic system configured to fold and unfold the wing frame section relative to the center frame section, and the hydraulic system is coupled to the hydraulic cylinder and configured to provide hydraulic fluid to actuate extension and retraction of the plurality of bars relative to the plurality of arms.

8. The tillage implement of claim 5, wherein the tillage implement comprises a hydraulic system coupled to the hydraulic cylinder, and the hydraulic system comprises one or more valves configured to regulate flow of hydraulic fluid to actuate extension and retraction of the plurality of bars relative to the plurality of arms in response to control signals received from a work vehicle coupled to the tillage implement.

9. The tillage implement of claim 1, wherein the tillage implement is a field cultivator.

10. A spike tooth harrow of a tillage implement, comprising:
   a plurality of arms configured to couple to a frame section of the tillage implement; and
   a plurality of bars coupled to the plurality of arms, wherein each bar of the plurality of bars comprises a plurality of spikes angled relative to a direction of travel of the tillage implement, the plurality of bars are coupled to the plurality of arms via cables, and the spike tooth harrow is configured to extend and to retract the plurality of bars relative to the plurality of arms;
   wherein each arm of the plurality of arms comprises a hydraulic cylinder disposed within, and the cables are coupled to an end of the hydraulic cylinder;
   wherein each arm of the plurality of arms comprises a top wall, and a first side wall and a second side wall flanking the top wall, and the first side wall comprises a slot extending along a portion of the first side wall relative to a longitudinal axis of a respective arm of the plurality of arms that the hydraulic cylinder is disposed within; and
   wherein each arm of the plurality of arms comprises a pin coupled to the end of the hydraulic cylinder, the pin extends out of the slot, and the cables are coupled to the pin.

11. The spike tooth harrow of claim 10, wherein the hydraulic cylinder is configured to adjust its cylinder stroke length to adjust both a position of the pin in the slot and a distance between the respective arm and the plurality of bars.

12. The spike tooth harrow of claim 11, wherein each bar of the plurality of bars is coupled to the pin with a different length cable.

13. A method for controlling extension and retraction of a spike tooth harrow of a tillage implement, comprising:
   adjusting a stroke length of a respective hydraulic cylinder disposed within each arm of a plurality of arms of the spike tooth harrow, wherein the plurality of arms are coupled to a plurality of bars, the plurality of bars are coupled to the plurality of arms via cables each bar of the plurality of bars comprises a plurality of spikes angled relative to a direction of travel of the tillage implement, and the plurality of bars are coupled to an end of each respective hydraulic cylinder via cables, wherein each arm of the plurality of arms comprises a top wall, and a first side wall and a second side wall flanking the top wall, and the first side wall comprises a slot extending along a portion of the first side wall relative to a longitudinal axis of a respective arm of the plurality of arms that the respective hydraulic cylinder is disposed within, and wherein each arm of the plurality of arms comprises a pin coupled to the end of the respective hydraulic cylinder, the pin extends out of the slot, and the cables are coupled to the pin; and
   in response to adjusting the stroke length, adjusting a distance between the plurality of arms and the plurality of bars.

* * * * *